L. B. SKINNER.
FRUIT SIZER.
APPLICATION FILED MAY 16, 1913.
1,071,472. Patented Aug. 26, 1913.
3 SHEETS—SHEET 1.
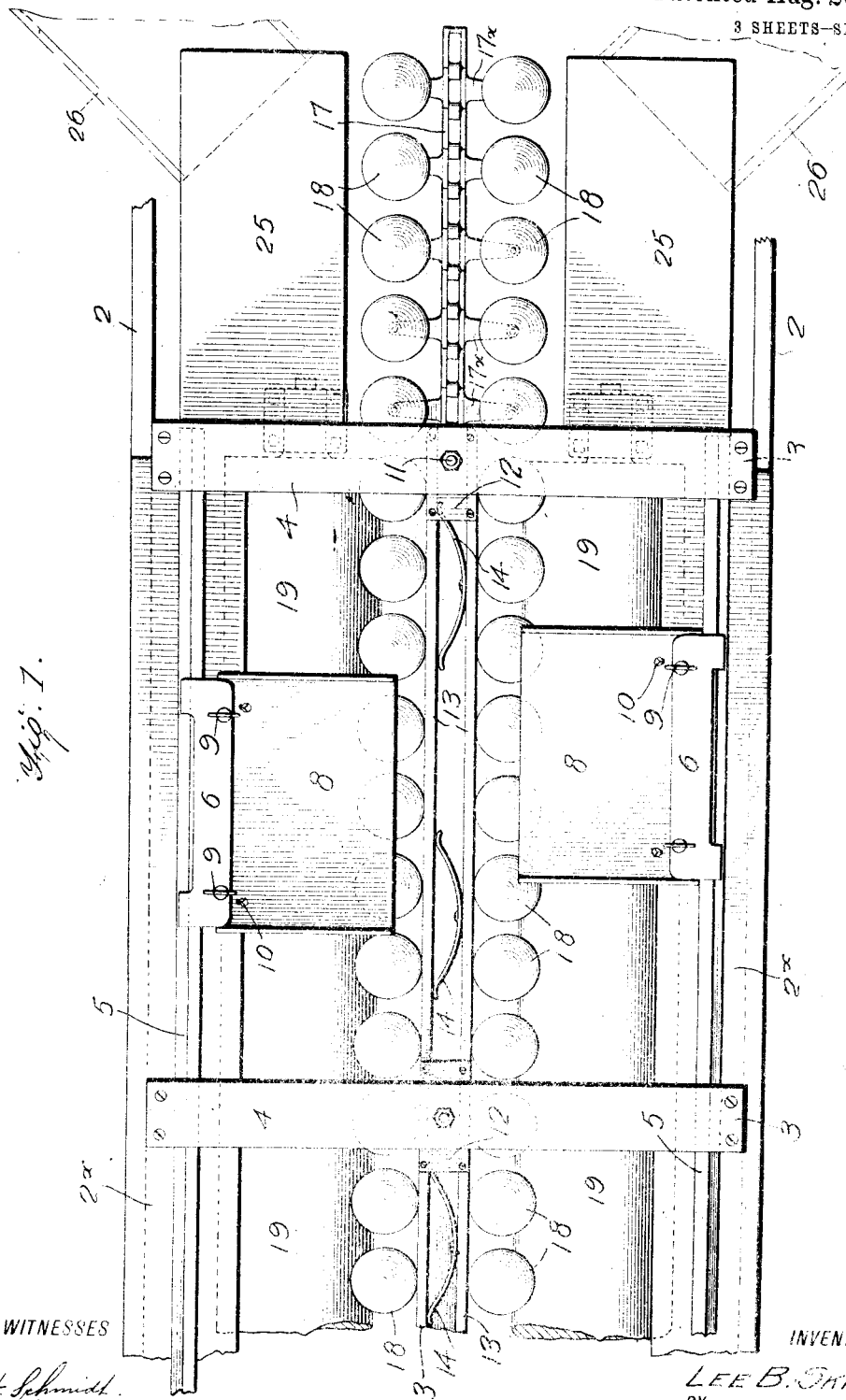
WITNESSES
L. H. Schmidt
L. H. Stanley
INVENTOR
LEE B. SKINNER,
BY
ATTORNEYS L. B. SKINNER.
FRUIT SIZER.
APPLICATION FILED MAY 16, 1913.
1,071,472.
Patented Aug. 26, 1913.
3 SHEETS—SHEET 2.
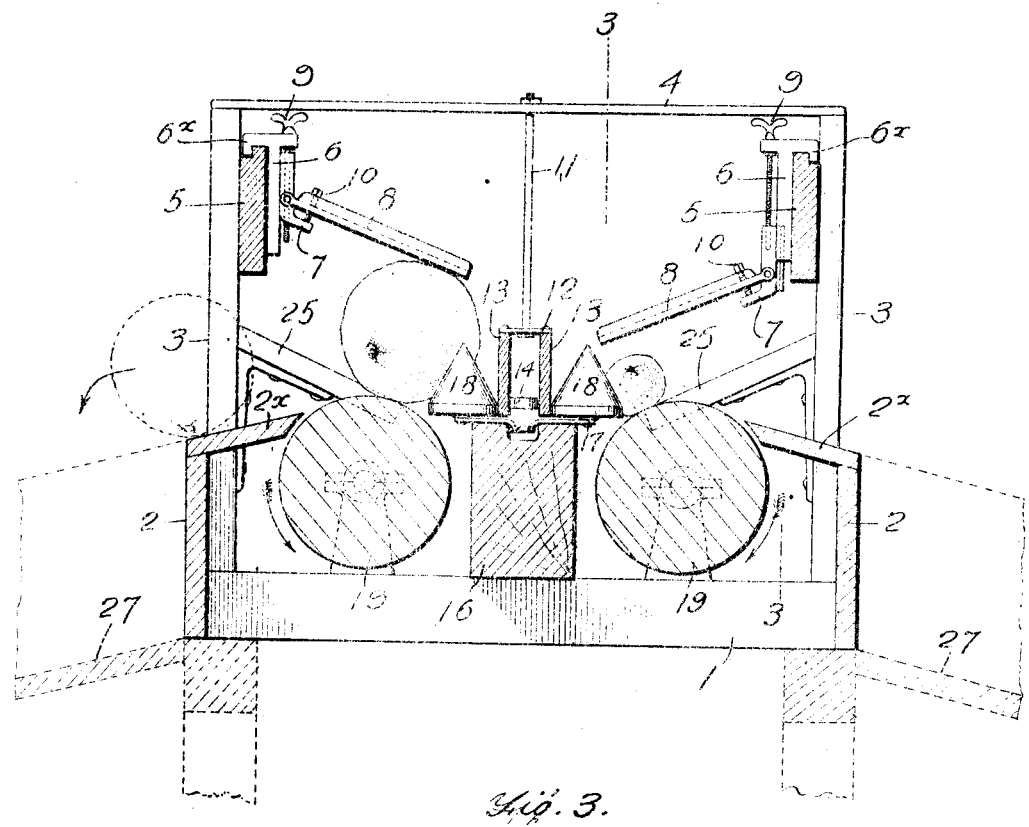
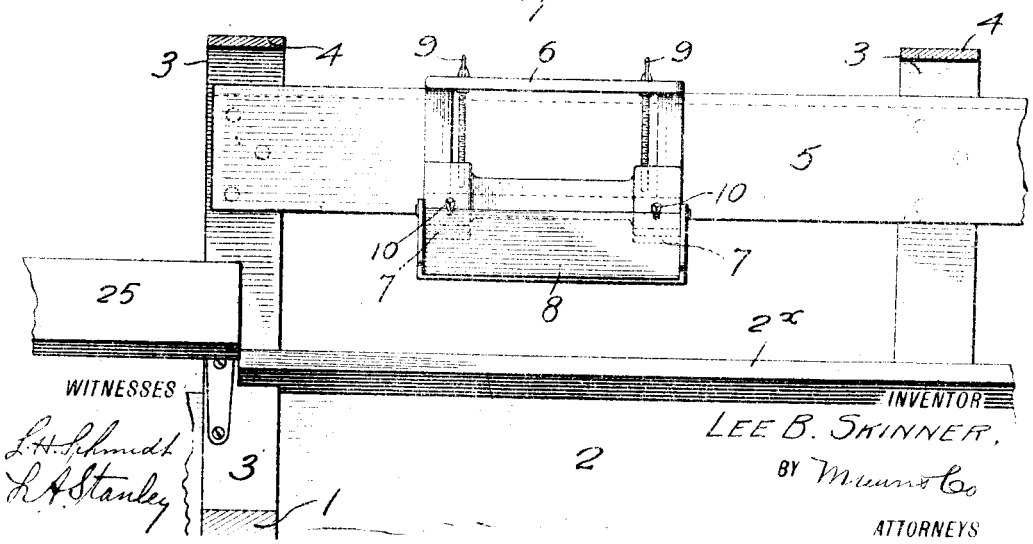
WITNESSES
L. H. Schmidt
L. H. Stanley
INVENTOR
LEE B. SKINNER,
BY Munn & Co
ATTORNEYS

L. B. SKINNER.
FRUIT SIZER.
APPLICATION FILED MAY 16, 1913.

1,071,472.

Patented Aug. 26, 1913.

3 SHEETS—SHEET 3.

WITNESSES

L. H. Schmidt
L. H. Stanley

INVENTOR

LEE B. SKINNER,

BY Munn & Co.

ATTORNEYS

UNITED STATES PATENT OFFICE.

LEE BRONSON SKINNER, OF DUNEDIN, FLORIDA.

FRUIT-SIZER.

1,071,472.          Specification of Letters Patent.          Patented Aug. 26, 1913.

Application filed May 16, 1913. Serial No. 767,993.

*To all whom it may concern:*

Be it known that I, LEE B. SKINNER, a citizen of the United States, and a resident of Dunedin, in the county of Pinellas and State of Florida, have made certain new and useful Improvements in Fruit-Sizers, of which the following is a specification.

My invention relates to improvements in devices for sizing fruits, such as oranges, grape fruit, lemons, and the like, and it consists in the combinations, constructions, and arrangements herein described and claimed.

An object of my invention is to provide a device which will automatically separate fruit, such as oranges into lots, each lot containing fruit of the same size.

A further object of my invention is to provide a device which is positive in action, and which will size the fruit without causing them to rub against one another.

A further object of my invention is to provide a device in which the sizing of small and large fruit is accomplished with equal facility.

Other objects and advantages will appear in the following specification and the novel features of the device will be particularly pointed out in the appended claims.

My invention is illustrated in the accompanying drawings forming part of this application in which—

Figure 4:
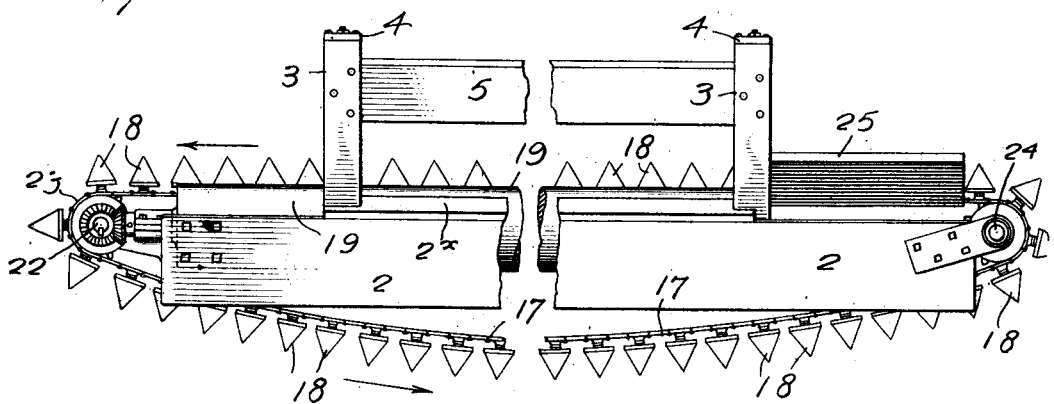
Figure 5:
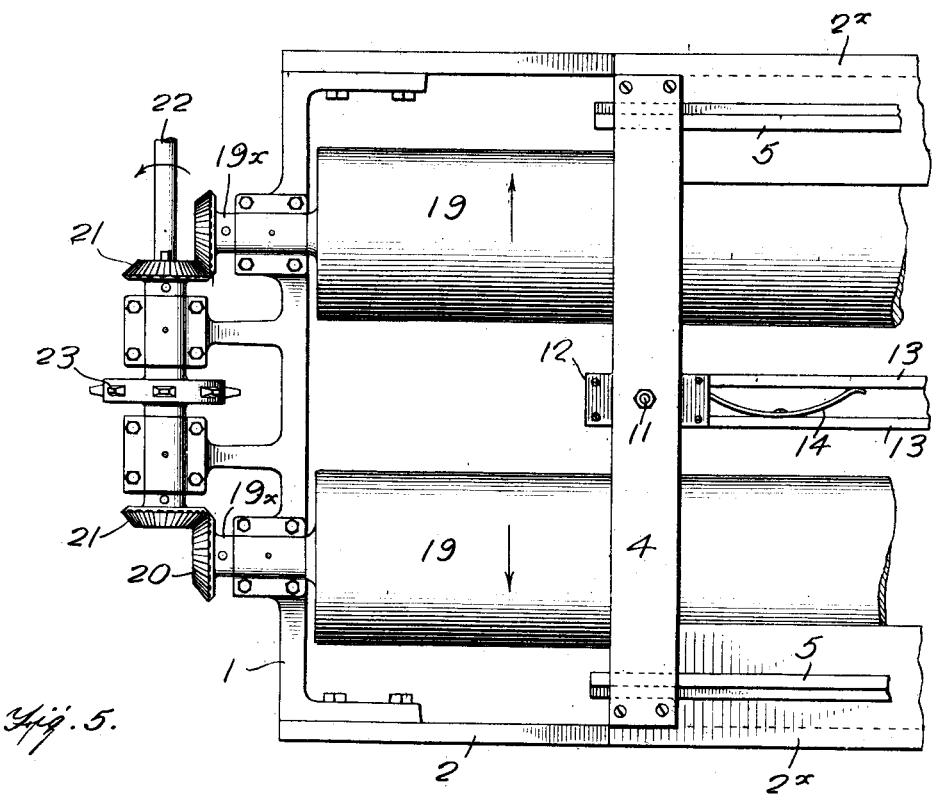

Figure 1 is a plan view of a portion of the device, Fig. 2 is a transverse section through the device, Fig. 3 is a section along the line 3—3 of Fig. 2, Fig. 4 is a side view of the device, certain parts being broken away, and Fig. 5 is a plan view of one end of the device, certain parts being removed for the sake of clearness.

In carrying out my invention I provide a main frame consisting of the lower member 1, side members 2, the uprights 3 and the top cross braces 4. Secured to the uprights 3 are longitudinal members 5 to which are secured supports 6 bearing adjustable brackets 7. To the latter are pivoted boards 8. The brackets 7 may be shifted by means of screws 9 and the angle at which the boards 8 are pivoted on the brackets 7 may be adjusted by means of the screws 10. The supports 6 may be placed at any point along the side members 5, these supports being hooked to the side members by means of the hooked portions 6ˣ, as shown in Fig. 2.

Suspended from the cross members 4 by means of vertical rods such as that shown at 11 are the plates 12 to which are secured parallel boards 13. One of these boards bears a series of springs 14 near its bottom, which tend to force the bottom portions of the board outwardly.

Below the boards 13 is a standard 16, which supports a link belt 17 having laterally extending arms 17ˣ which bear at their ends cones 18, which are pivoted on vertical axes. The bases of the cones 18 are designed to come in contact with the lower edges of the boards 13. The latter are held against the cones by means of the springs 14. Although the boards 13 are secured to the plates 12 the lower edge of the boards may have a slight movement so as to be held in close contact with the base of the cones.

Disposed longitudinally of the device are the rollers 19. The shafts 19ˣ of the rollers bear gears 20, which are arranged to be operated by gears 21 on the power shaft 22. A sprocket 23 is arranged to receive the sprocket chain 17. This chain passes over the sprocket wheel 23 down underneath the machine and around a sprocket wheel 24 at the opposite end (see Fig. 4). At one end of the device is a pair of inclined shelves or platforms 25. At the tops of the side members 2 are inwardly extending flanges 2ˣ which form inclined runways for delivering the fruit.

From the foregoing description of the various parts of the device the operation thereof may be readily understood.

In the sizing of such fruit, as oranges, it is generally necessary to separate the fruit into lots of seven different sizes. There would be, accordingly, on each side of the central portion of the machine, seven movable boards like those shown at 8. These boards may be arranged at any position along the side members 5 for discharging the fruit. The one nearest the point of entrance of fruit into the machine would be raised from the surface of the rollers 19 about three and one half inches, the next one three and one quarter inches, and so on down. The fruit is deposited on the inclined boards 25 at one end of the machine, in any suitable manner, as by chutes 26 (see Fig. 1). The belt is now driven in the direction shown by the arrows in Fig. 1 and the fruit will roll toward the cones and will be carried toward the rollers 19. These rollers are revolving in the direction shown by the arrows in Fig. 2. The fruit will therefore be subjected to a rotary movement by both the cones and the roller upon which it is traveling. The resultant of these two motions is a revolution about an axis disposed between the cone and the roller. As will be seen from Fig. 2 this axis will be a diagonal line inclined from the vertical. This gives a better sizing because the fruit will be sized according to the average or mean diameter. In packing a box of fruit it is important that the size of the fruit be uniform. Therefore to properly size the fruit the mean diameter which passes diagonally through the fruit should be taken. This is accomplished by the means just described. The fruit passes along, revolving as it passes, until it comes in contact with one of the boards 8. These boards, as shown in the drawings, are hinged so as not to injure the fruit. They present sufficient resistance to the rotary motion, however, so that the continued passage of the belt bearing the cones together with the rotary movement of the roller upon which it is supported will force the fruit over the top of the roller and down the incline 2ˣ into any suitable receptacle such as the bin 27, shown in dotted lines in Fig. 2. The position of the boards 8, as has been stated before, and the height of the boards may be adjusted. The inclination of the boards may also be adjusted by means of the screws 10. The smaller fruit will of course pass to the other end of the device until forced outwardly by coming into contact with the proper sizing device.

It will be seen that the sizing of the fruit is automatic after the device has been once adjusted. The fruit is carried along gently and is not dropped except when it passes into the bin. There is therefore small chance of injury to the fruit.

I claim:—

1. In a fruit sizing device, a roller mounted for rotation on its longitudinal axis, a traveling member disposed adjacent to said roller near the upper part thereof, cones carried by said traveling member, means for causing the revolution of the cones, and a contact member adjustable toward and away from said roller and said cones.

2. In a fruit sizing device, a roller mounted for rotation on its longitudinal axis, a traveling belt disposed adjacent to said roller near the upper part thereof, cones carried by said belt, means for causing the revolution of the cones during the travel of the belt, and a contact member adjustable toward and away from said roller and said cones.

3. In a fruit sizing device, a frame, a roller carried by said frame, said roller being mounted for rotation on its longitudinal axis, a traveling belt disposed parallel with said roller and spaced therefrom, a series of cones mounted for rotation on said belt, means for delivering fruit between the adjacent cones, means for causing the travel of the belt to force the fruit upon said roller, and an adjustable sizing member disposed above said roller for engaging the fruit.

4. In a fruit sizing device, a frame, a revolving roller carried by said frame, a support disposed longitudinally of said roller and spaced therefrom, a traveling belt carried by said support, means for moving said traveling belt, a series of cones mounted upon said belt, means arranged to engage the surface of the cones for causing the rotation of the latter, means for delivering fruit between adjacent cones, the movement of the cones serving to carry the fruit upon the revolving roller, and an adjustable contact member arranged to engage the fruit and acting conjointly with the roller and the cones to discharge the fruit laterally of the roller.

5. In a fruit sizing device, a frame, a pair of parallel rollers mounted for rotation in said frame, means for revolving said rollers in opposite directions, a support disposed between said rollers, a traveling belt carried by said support, a series of cones carried by the opposite edges of said belt, said cones being disposed in close proximity to the said rollers, means for revolving the cones during the passage of the belt, and a series of adjustable hinged contact members disposed above each of said rollers.

6. In a fruit sizing device, a frame, a pair of parallel rollers mounted for rotation in said frame, means for revolving said rollers in opposite directions, a support disposed between said rollers, a traveling belt carried by said support, a series of cones carried by the opposite edges of said belt, said cones being disposed in close proximity to the said rollers, means for revolving the cones during the passage of the belt, a series of adjustable hinged contact members disposed above each of said rollers, and means for varying the inclination of said hinged contact members.

7. In a fruit sizing device, a frame, a pair of parallel rollers rotatably mounted in said frame, means for rotating said rollers in opposite directions, a central support disposed between said rollers, a traveling belt carried by said central support, means for moving the belt along said support, a series of cones rotatably mounted on the upper outer edges of the belt, contact members disposed between the cones, means for forcing said contact members into engagement with the cones, a series of brackets disposed above each of said rollers and adjustable longitudinally thereof, means for adjusting the height of the brackets above the rollers, and a contact member hinged to each of said brackets.

LEE BRONSON SKINNER.

Witnesses:
 GERTRUDE P. MORTON,
 NELLIE A. CUSHING.